(12) United States Patent
du Breuil

(10) Patent No.: US 12,028,586 B2
(45) Date of Patent: *Jul. 2, 2024

(54) ADVERTISEMENT PREPARATION SYSTEMS

(71) Applicant: ARRIS Enterprises LLC, Suwanee, GA (US)

(72) Inventor: Thomas L. du Breuil, Ivyland, PA (US)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/952,074

(22) Filed: Sep. 23, 2022

(65) Prior Publication Data

US 2023/0021164 A1    Jan. 19, 2023

Related U.S. Application Data

(63) Continuation of application No. 17/215,504, filed on Mar. 29, 2021, now Pat. No. 11,477,540.

(60) Provisional application No. 63/002,973, filed on Mar. 31, 2020.

(51) Int. Cl.
H04N 21/234    (2011.01)
H04N 21/262    (2011.01)
H04N 21/2668   (2011.01)
H04N 21/44     (2011.01)
H04N 21/81     (2011.01)

(52) U.S. Cl.
CPC ................................ *H04N 21/812* (2013.01)

(58) Field of Classification Search
None
See application file for complete search history.

(56) References Cited

U.S. PATENT DOCUMENTS

| | | | | |
|---|---|---|---|---|
| 2007/0292103 | A1* | 12/2007 | Candelore | G11B 27/005 386/234 |
| 2010/0329359 | A1  | 12/2010 | Iyer et al. | |
| 2013/0347033 | A1* | 12/2013 | Grab | H04N 21/488 725/34 |
| 2014/0105567 | A1* | 4/2014  | Casagrande | G11B 27/19 386/230 |

(Continued)

FOREIGN PATENT DOCUMENTS

EP    2941001 A1    11/2015

OTHER PUBLICATIONS

International Search Report and Written Opinion Re: Application No. PCT/US2021/024610 dated Jun. 16, 2021.

*Primary Examiner* — Brian T Pendleton
*Assistant Examiner* — Jean D Saint Cyr
(74) *Attorney, Agent, or Firm* — Chernoff, Vilhauer, McClung & Stenzel, LLP (57) ABSTRACT

Advertisement preparation methods and systems are shown and disclosed. In one embodiment, the method includes reviewing metadata of an advertisement. The metadata includes duration information for the advertisement, and determining actual duration of the advertisement. The method additionally includes determining whether the duration information matches the actual duration of the advertisement, and editing the advertisement when the duration information does not match the actual duration such that the actual duration of the edited advertisement matches the duration information.

20 Claims, 4 Drawing Sheets

(56) References Cited

U.S. PATENT DOCUMENTS

| | | | |
|---|---|---|---|
| 2014/0115625 A1* | 4/2014 | McCoy | H04N 21/23424 |
| | | | 725/34 |
| 2016/0094875 A1* | 3/2016 | Peterson | H04N 21/4312 |
| | | | 725/41 |
| 2018/0102106 A1* | 4/2018 | Shintani | H04N 21/42607 |
| 2020/0059692 A1 | 2/2020 | Chung et al. | |
| 2020/0228813 A1* | 7/2020 | Ramaswamy | H04N 21/262 |

* cited by examiner

ADVERTISEMENT PREPARATION SYSTEMS

CROSS REFERENCE TO RELATED APPLICATIONS

This application is a continuation of Ser. No. 17/215,504, filed Mar. 29, 2021, which claims benefit of U.S. Provisional Application No. 63/002,973 filed Mar. 31, 2020, the entire disclosure of which is hereby incorporated herein by reference for all purposes.

BACKGROUND

The subject matter of this application relates to advertisement preparation, in particular advertisement preparation performed either in real-time or in advance of showing the advertisements to viewers.

Advertisements (ads) or advertisement media, such as advertisements provided by third party sources, is often incorrect for the different client types. For example, advertisement media may be longer than its specified duration. In legacy linear ad insertion solutions, this does not create any shifts in the overall program timeline because the splicer transitions back into the program stream without disrupting the timeline such that the ad either overruns or underruns the allocated slot in the program if it is too long or short, respectively (assuming that the ad system is configured to give priority over the programs to playing ads in their entirety). In contrast, if the ad system is configured to prioritize the program over the ads, then an ad that is too long is truncated early in order to return to the program at the indicated end of the ad break. In this latter scenario, if the ad is too short, the ad would play to its end and the splicer will switch back to the program source which may result in a short amount of the underlying media being seen which might be a default ad or public service announcement that was embedded by the programmer in the media stream for the indicated duration of the ad break. With the ad system configured either way, the media timeline is always honoured in the legacy ad insertion systems such that there is no shift in the latency seen by the viewer.

However, in adjustable bit rate (ABR) manifest manipulation systems, the transitions from the program to the ad and back again can happen only at segment boundaries. The net result is that if an ad is longer than the SCTE-35 specified ad avail, such as by three frames, then the program will be delayed by three frames. Over a period of hours after several such ads have been inserted, the ABR program can be lagging behind the original version of the program by seconds. Viewers of the ABR streams will be lagging viewers of legacy video delivery systems, listeners of radio, and even viewers of social media postings related to the event. For example, viewers of the ABR streams may see a social media post about the winning play in a sporting event on their phone but the play hasn't even started on their video service. When the shift reaches a program segment length, the manifest manipulator can and will drop a program segment to restore the program timeline. Such a drop may be significant as it might result in an important play being missed during a sporting event or unnatural disconnects in other events.

What is desired, therefore, is an ad ingest processing improvement to minimize such shifts in the timeline as well as reducing the need for the manifest manipulator to skip (or repeat) program segments in order to reset the times due to drift.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
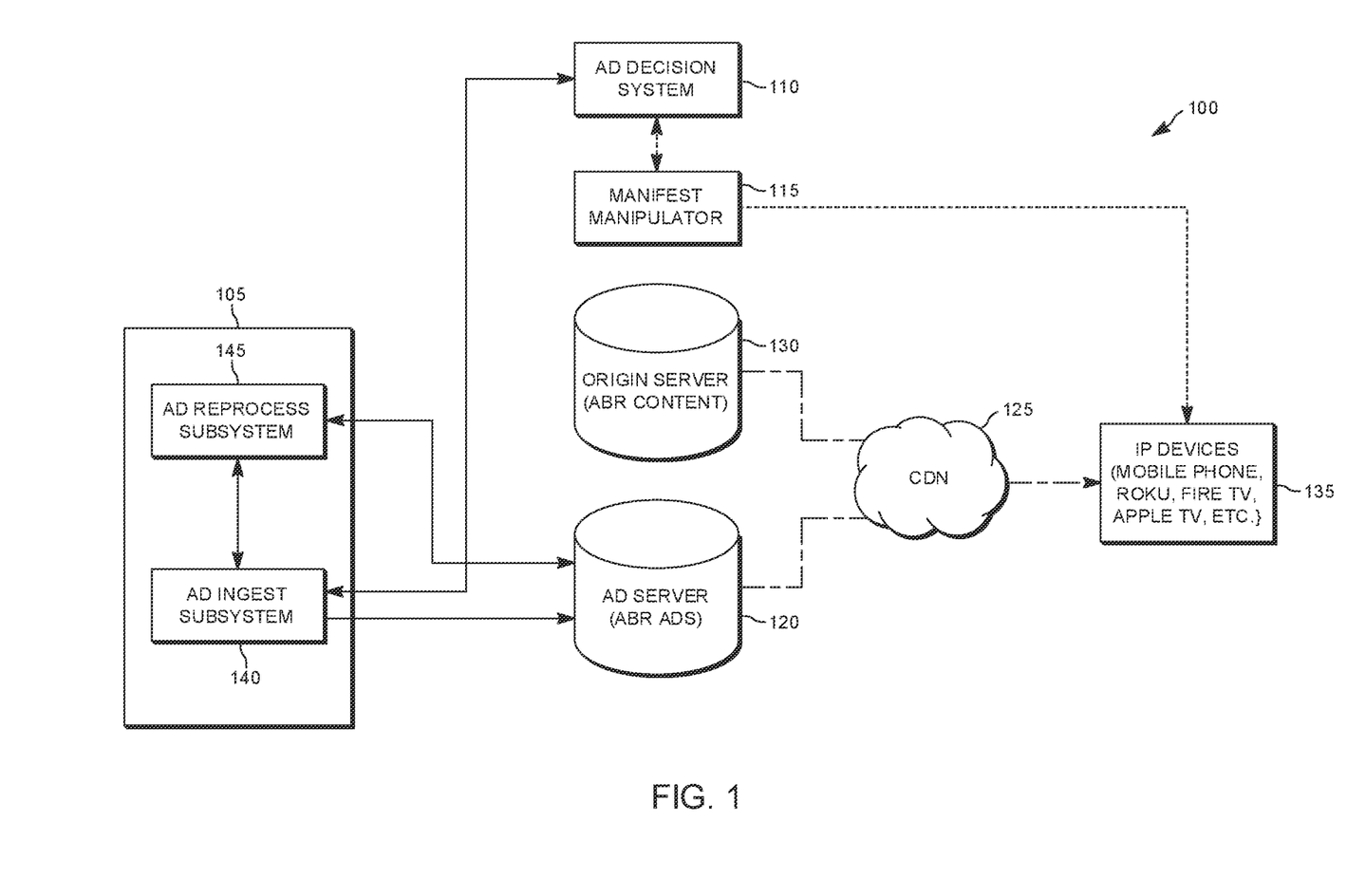
FIG. 1 is a high-level block diagram of an example of a network to facilitate advertisement preparation.

Referring to FIG. 1, an example network environment 100 operable to facilitate advertisement preparation (either in real-time or in advance) is shown. Live linear adjustable bitrate (ABR) content is received from various sources and is stored on an origin server 130. Similarly, advertisements are received from various sources, processed by an advertisement preparation system 105, and then stored on an ad server 120. The advertisements received may not be in ABR format, or may not be in correct ABR format with respect to the service provider's system requirements. Advertisement preparation system 105 transcodes and packages the advertisement to meet the system's requirements, and then publishes or stores that advertisement in ad server 120 and sends metadata about the advertisement to an advertisement decision system (ADS) 110.

When an IP client or device 135 requests a "channel" to watch, that device will send the uniform resource locator (URL) for the particular channel to a manifest manipulator 115. The manifest manipulator returns the master playlist for the particular channel to the IP device. The IP device then selects which variant from the master playlist it will consume based typically on the device's capabilities and available bandwidth and sends the URL corresponding to the selected variant to manifest manipulator 115. The manifest manipulator then returns the media playlist to the IP device. IP device 135 starts requesting media segments in the media playlist and the URLs point to origin server 130. As shown in FIG. 1, playlists flow from manifest manipulator 115 to IP device 135, while media content flows from either origin server 130 or ad server 120 to IP device 135 via a content delivery network (CDN) 125.

When manifest manipulator 115 detects the ad marker tags in the media playlist, it sends an inquiry to advertisement decision system 110 with the ad window duration. In response, the advertisement decision system sends the URL(s) of the advertisement(s) that should be inserted into the ad breaks for the particular channel/program. Manifest manipulator 115 then modifies the media playlist it delivers to the IP device for the duration of the ad break to point to the media playlist for the desired advertisements.

Advertisement preparation system 105 includes an ad ingest subsystem 140. The ad ingest subsystem may pull advertisement media from third parties and transcode the advertisement media as needed to ensure the advertisement conforms to delivery specifications that are required for high-quality delivery to a variety of client types. Advertisement preparation system 105 also includes an ad reprocess subsystem 145 that reprocesses advertisements, such as advertisements that are either shorter or longer than specified as further discussed below.

In some embodiments, advertisement preparation by the advertisement preparation system 105 may be triggered in response to a received notice or request that advertisement media is needed or may be needed at a future time. Additionally, advertisement preparation by the advertisement preparation system 105 may be triggered by a pre-notice of advertisement media locators (e.g., URL (uniform resource locator)) received from advertisement decision system 110 that provides advertisement media locators. For example, the pre-notice of advertisement media locators may be received from an advertising campaign manager.

In some embodiments, advertisement preparation by the advertisement preparation system 105 may be triggered by an early advertisement decision to the advertisement decision system 110 for one or more client types where all advertisement media locators are extracted. For example, the advertisement decision system may establish one or more test client devices having delivery specifications that match delivery specifications associated with the one or more client types. The advertisement preparation system 105 may retrieve and transcode the requested advertisement media according to the delivery specifications associated with the test client device.

In some embodiments, advertisement preparation by the advertisement preparation system 105 may be triggered by a copy of advertisement decisions received from a manifest manipulator (manifest delivery controller) 115. The advertisement preparation system 105 may enable configuration of defined advertisement media formats for each of one or more client types and the advertisement preparation system 105 may ensure that advertisement media conforms with these defined formats. The advertisement preparation system 105 may manage a prioritization queue of all advertisement media requests and may utilize both on-site and cloud based transcoding engines to transcode the requested advertisement media to an appropriate format. The advertisement preparation system 105 may support HTTP (hypertext transfer protocol) and HTTPs (hypertext transfer protocol secure) requests. Additionally, the advertisement preparation system 105 may manage a cache and time-to-live (TTL) of advertisement media.

In some embodiments, the advertisement preparation system 105 may remap advertisement media locators from an original source (e.g., advertisement media source 120) to new locators prepared by the advertisement preparation system 105. For example, this may map to a managed CDN (content delivery network) 125 that may enable high-quality delivery. The manifest manipulator 115 may retrieve playback information and location information, and the manifest manipulator 115 may retrieve a channel manifest and/or an advertisement manifest from a CDN 125.

In some embodiments, the advertisement preparation system 105 may provide origin services for new advertisement media that has been prepared in the configured formats. The advertisement preparation system 105 may enable quality rules to ensure all assets exist, check stream types such as secondary audio, captions, DRM (digital rights management), and others. Additionally, the advertisement preparation system 105 may maintain a listing of monitored advertisement media including life cycle tracking and usage reporting. This may be carried out within the manifest manipulator 115 at the backend caching.

In some embodiments, the advertisement preparation system 105 may maintain an event log of advertisement media that may trigger deferred actions which may also transcode or carry out other tasks (e.g., quality controls, purging bad, etc.). The advertisement preparation system 105 may enable real-time or deferred monitoring of advertisement media usage to enable quality controls of parameters, such as audio levels, GOP (group of pictures) parameters, encoding requirements, watermarks, and/or others.

In some embodiments, the advertisement preparation system 105 may allow operator management of a prioritized transcode queue to control response times of restricted resources. Additionally, the advertisement preparation system 105 may use the delivery order of advertisement media to control transcode priority. For example, advertisement media scheduled at the end of a break may be transcoded after advertisement media that is scheduled at the start of the break.

In some embodiments, the advertisement preparation system 105 may be implemented on systems within service provider networks along with transcoders, or the advertisement preparation system 105 may run completely in the cloud. The advertisement preparation system 105 may leverage modern micro-services software architecture and web serving systems. Additionally, the advertisement preparation system 105 may be scalable to support the highest concurrency of advertisement preparation needed to support a service provider's advertising business.

In some embodiments, the advertisement preparation system 105 may provide high-quality advertisement delivery by delivering advertisement media that has been formatted by the advertisement preparation system 105 according to configured media formats that are associated with one or more client types. Additionally, advertisement media may be retrieved by the advertisement preparation system 105 from a third-party source (e.g., advertisement media source 120), and the retrieved advertisement media may be transcoded by the advertisement preparation system 105. The advertisement media may be transcoded according to one or more delivery specifications associated with a targeted client device/device type. For example, delivery specifications may include screen resolution (high-definition, standard-definition, 4K, etc.), screen size, audio level, secondary audio, captions, DRM, GOP parameters, encoding requirements, watermarks, and others. In embodiments, the transcoded advertisement media may be delivered through the CDN 125 to a CPE (customer premise equipment) device 130, an IP (Internet protocol) device 135, a mobile device 140, or other user device.

In some embodiments, network environment 100 is operable to facilitate advertisement preparation through the use of an advertisement decision proxy (not shown). For example, advertisement preparation by the advertisement preparation system 105 may be triggered by a copy of advertisement decisions received from an advertisement decision proxy. The advertisement decision proxy may be between the manifest manipulator 115 and advertisement decision system 110. In some embodiments, advertisement preparation by the advertisement preparation system 105 may be triggered by the advertisement decision 145 that provides advertisement manifests to the manifest manipulator 115.

Figure 2:
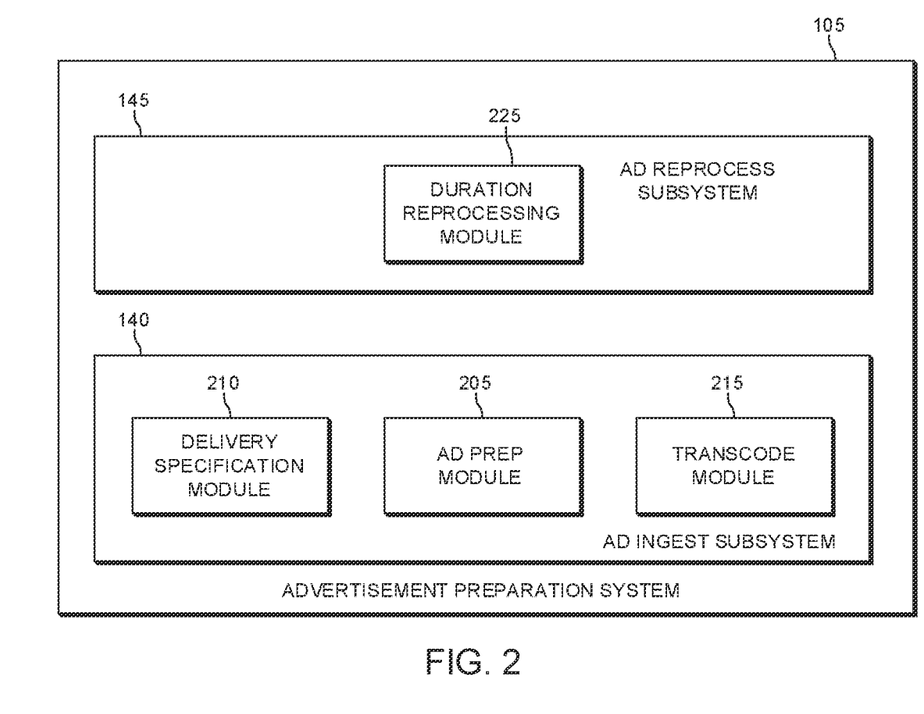
FIG. 2 is a block diagram of an example of an advertisement preparation system operable to facilitate advertisement preparation.

FIG. 2 is a block diagram illustrating an example advertisement preparation system 105 operable to facilitate advertisement preparation. Advertisement preparation system 105 includes ad ingest subsystem 140 and ad reprocess subsystem 145. The ad ingest subsystem includes an ad prep module 205, a delivery specification module 210, a transcode module 215, and an ad media data store 220. Ad reprocess subsystem 145 includes a duration processing module 225.

In some embodiments, advertisement preparation by the advertisement preparation system 105 may be triggered by an early advertisement decision to the advertisement decision system 110 for one or more client types where all advertisement media locators are extracted. For example, the advertisement decision system may establish one or more test client devices having delivery specifications that match delivery specifications associated with the one or more client types. The ad prep module 205 may retrieve the requested advertisement media and the transcode module 215 may transcode the retrieved advertisement media according to the delivery specifications associated with the test or targeted client device. A transcoding system that is external to the advertisement preparation system 105 may be used to transcode the retrieved advertisement media.

In some embodiments, the advertisement preparation system 105 may enable configuration of defined advertisement media formats for each of one or more client types and the advertisement preparation system 105 may ensure that advertisement media conforms with these defined formats. For example, the delivery specification module 210 may be configured with delivery specifications associated with one or more different client device types. The delivery specification module 210 may retrieve delivery specifications associated with one or more different client device types. The advertisement preparation system 105 may manage a prioritization queue of all advertisement media requests and may utilize both on-site (e.g., transcode module 215) and cloud based transcoding engines to transcode the requested advertisement media to an appropriate format.

In some embodiments, the ad prep module 205 may remap advertisement media locators from an original source (e.g., advertisement media source 120) to new locators prepared by the ad prep module 205. For example, this may map to a managed CDN (content delivery network) 125 of FIG. 1 that may enable high-quality delivery. Transcoded advertisement media may be stored at the ad media data store 220.

In some embodiments, the ad prep module 205 may maintain a listing of monitored advertisement media including life cycle tracking and usage reporting. Additionally, the ad prep module 205 may maintain an event log of advertisement media that may trigger deferred actions which may also transcode or carry out other tasks (e.g., quality controls, purging bad, etc.). Moreover, the ad prep module 205 may enable real-time or deferred monitoring of advertisement media usage to enable quality controls of parameters such as audio levels, GOP (group of pictures) parameters, encoding requirements, watermarks, and/or others. Furthermore, the ad prep module 205 may allow operator management of a prioritized transcode queue to control response times of restricted resources. Additionally, the ad prep module 205 may use the delivery order of advertisement media to control transcode priority. For example, advertisement media scheduled at the end of a break may be transcoded after advertisement media that is scheduled at the start of the break.

In some embodiments, the ad prep module 205 may review metadata of advertisement media, which may include various type of information regarding the advertisement media, such as information regarding the duration of the advertisement media. Additionally, the ad prep module 205 may determine one or more actual properties or characteristics of the advertisement media, such as the actual duration, and determine if the metadata information matches the actual characteristics. Moreover, duration reprocessing module 225 may edit the advertisement media when the metadata information does not match the actual characteristics prior to the advertisement media being transcoded according to one or more delivery specifications associated with the target client device(s).

Figure 3:
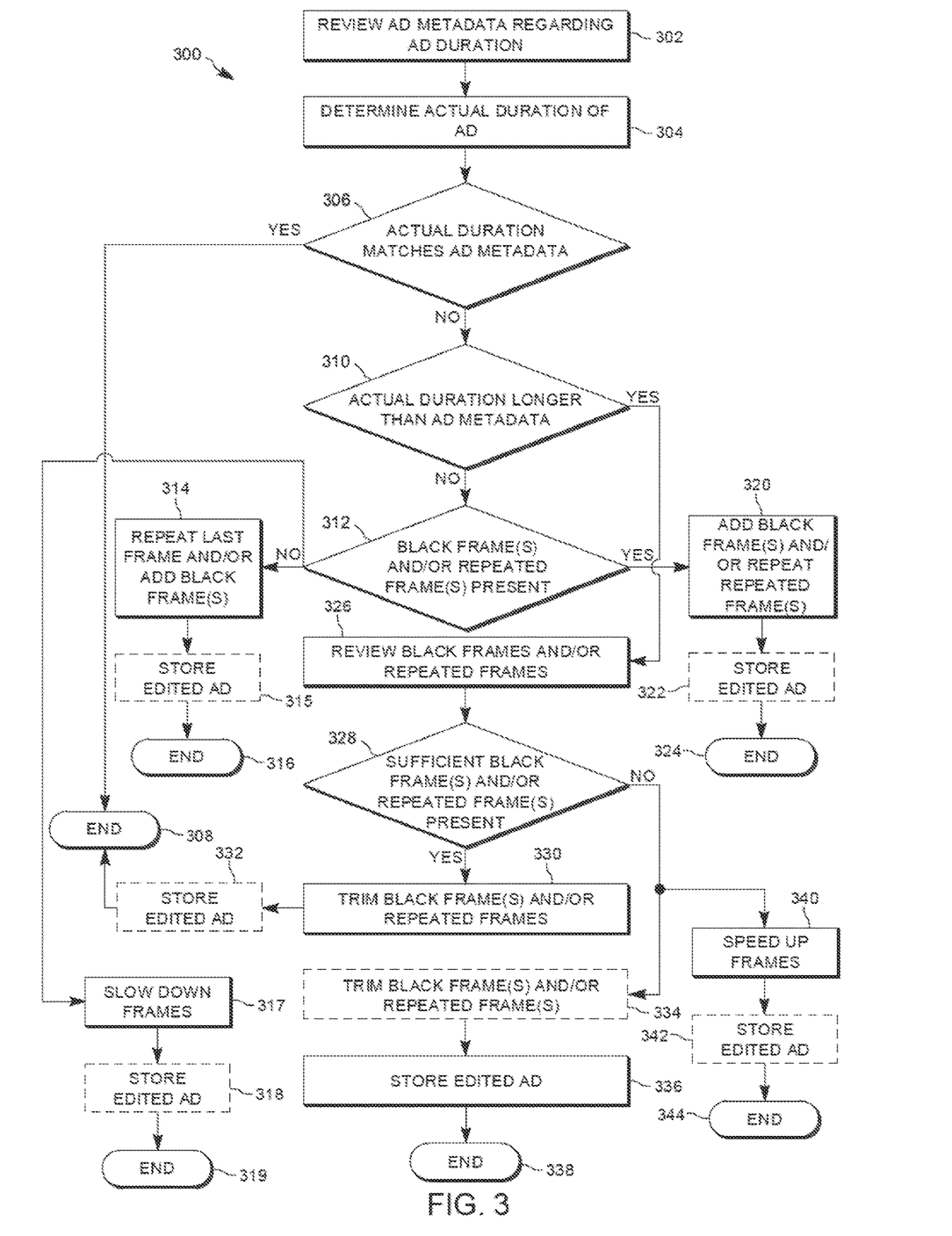
FIG. 3 is a flowchart illustrating an example process of advertisement preparation.

Referring to FIG. 3, a flowchart is shown of an example process of advertisement preparation, which may be performed, for example, by advertisement preparation system 105 (e.g., ad prep module 205 and/or duration reprocessing module 225). At 302, metadata of the advertisement media is reviewed regarding duration of the advertisement media. At 304, the actual duration of the advertisement media is determined. At 306, the actual duration is compared with the metadata regarding duration to determine if the two values match. If the two values match or are the same, then the process ends at 308.

If the actual duration and the metadata regarding duration do not match, then it is determined whether the actual duration is longer than the duration specified in the metadata at 310. If the actual duration is not longer than the duration specified in the metadata (i.e., the actual duration is shorter), then it is determined whether there are one or more black frames and/or one or more repeated frames at 312. The black frames and repeated frames may be in any portions of the advertisement. For example, the black frame may be at the beginning and/or end of the advertisement. The repeated frames may be at the beginning, middle, and/or end of the advertisement. For example, there may be repeated frames when there is a scene change in the advertisement.

If there are no black frames and no repeated frames, then black frames may be added and/or the last frame may be repeated at 314. If several frames need to be added, the last frame can be repeated and the repeated frames can be faded out to black over the duration of the repeated frames. For example, the last frame may show a still image, such as a company's logo, and that frame may be repeated and/or faded out to black. The edited advertisement media may be recorded at 315 and the process ends at 316. Alternatively, or additionally, the frames may be slowed down at 317 so that the frames still have all the original content but all the frames in the advertisement are interpolated to (or replaced with) new frames of the correct target duration (with the new frames being more in quantity than the original frames) and the audio is reprocessed to the correct pitch. The edited advertisement media may be recorded at 318 and the process ends at 319.

If there are black frames and/or repeated frames, then black frames may be added and/or repeated frames may be further repeated at 320 to match actual duration of the advertisement media to the duration specified in the metadata. For example, if there are a single frame that is repeated twice for a total of three identical frames in an advertisement, then the frames may be repeated three more times so that there are six identical frames instead of three identical frames in the edited advertisement. In other words, one or more frames that are identical (or substantially identical) to the repeated frames are added to the advertisement. When black frames are added, it may be desirable to add or remove some black frames at the beginning and end in order to keep the leading and trailing black about the same duration. For example, black frames may be added such that there is the same number of black frames in the beginning and in the end of the advertisement. The edited advertisement media may be recorded at 322 and the process ends at 324.

If the actual duration is longer than the duration specified in the metadata at 310, then the black frame(s) and/or repeated frames are reviewed at 326. At 328, it is determined if there are sufficient black frame(s) and/or repeated frame(s) present in the advertisement that can be trimmed. If there are sufficient black frame(s) and/or repeated frame(s), then the black frame(s) are trimmed, removed, or deleted and/or the repeated frames trimmed, removed, or deleted at 330 such that actual duration of the advertisement media matches the duration specified in the metadata. The edited advertisement media may be recorded at 332 and the process ends at 308. In some embodiments, there may be a predetermined minimum number of black frames in the beginning of the advertisement that the advertisement preparation system maintains to ensure a smooth transition from the program to the advertisement. In those embodiments, the advertisement preparation system does not delete the black frames below the predetermined minimum. In other embodiments, the black frames may be delete such that there is the same number of black frames in the beginning and in the end of the advertisement.

If there is an insufficient number of black and/or repeated frames, then the last frame(s) may be trimmed (e.g., frames showing the company's logo) at 334. The edited advertisement media may be recorded at 336 and the process ends at 338. Alternatively, or additionally, the frames may be sped up at 340 so that the frames still have all the original content but all the frames in the advertisement are interpolated to (or replaced with) new frames of the correct target duration and the audio is reprocessed to the correct pitch. For example, when the actual duration of the advertisement is longer than the duration specified in the metadata, the original sequence of frames in the advertisement may be interpolated to a new sequence with fewer interpolated frames in order to meet the target duration. The edited advertisement media may be recorded at 342 and the process ends at 344.

Although FIG. 3 shows particular steps for a process of advertisement preparation, other examples of the process may add, omit, replace, repeat, and/or modify one or more steps. For example, when the advertisement has an actual duration that does not match its metadata then the metadata also may be updated to indicate the actual duration. Additionally, or alternatively, the advertisement may be flagged as noncompliant and sent back to the ad vendor. Moreover, the audio associated with the advertisement may be edited to ensure that the audio is synchronized with the edited advertisement. For example, the audio may be reprocessed to extend or reduce duration of the audio to match the duration of the edited advertisement and then the pitch of the audio is corrected. Furthermore, the step of reviewing the metadata of the advertisement may be omitted. Additionally, the actual duration of the advertisement may alternatively, or additionally, be compared with information other than the duration information in the metadata of the advertisement, such as a predetermined target duration that is not in the metadata of the advertisement (e.g., the allocated slot or the SCTE-35 specified ad avail).

Figure 4:
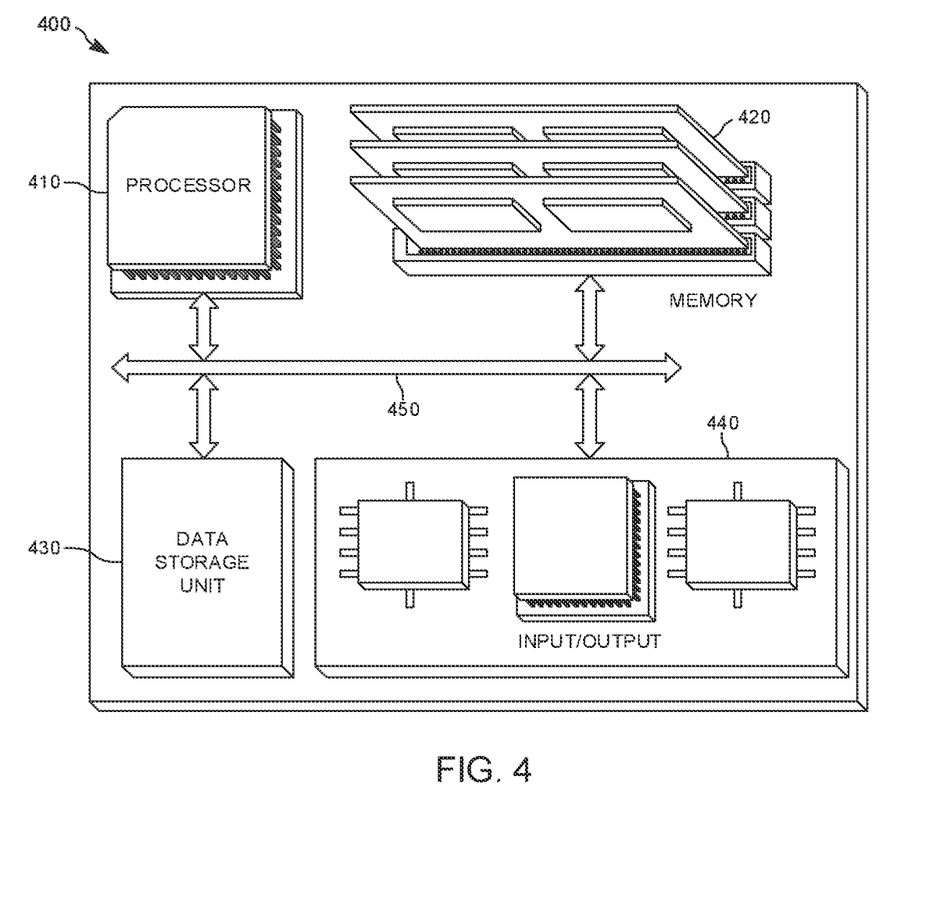
FIG. 4 is a block diagram of an example of a hardware configuration operable to facilitate advertisement preparation.

Referring to FIG. 4, a hardware configuration 400 operable to facilitate advertisement preparation is shown. The hardware configuration may be configured to implement or execute one or more of the processes performed by any of the various engines, modules, and devices described in the present disclosure, including the advertisement preparation system and its various subsystems and modules. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit. In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In embodiments, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device, IP device, mobile device, or other device. In embodiments, the input/output device can include driver devices configured to send communications to, and receive communications from an advertisement decision system, an advertisement media source, and/or a CDN.

Those skilled in the art will appreciate that the invention improves upon methods and systems for carrying out preparation of advertisement media. Methods, systems, and computer readable media can be operable to facilitate advertisement preparation. An advertisement preparation system may retrieve requested advertisement media from a third-party source. Based upon an identification of a targeted client device that is to receive the advertisement media, the advertisement preparation system may determine delivery specifications associated with the targeted client device. The advertisement preparation system may review the advertisement media's metadata to determine specified duration, determine actual duration of the advertisement media, and then edit the advertisement media such that the actual duration matches the specified duration. The advertisement preparation system may transcode the retrieved advertisement media according to the delivery specifications associated with the targeted client device, and the transcoded advertisement media may be delivered to the targeted client device.

The methods, systems, and apparatuses described in this disclosure enable the identification and retrieval of one or more preferred or requested media renditions of multimedia content. A subscriber device can maintain a list of media attributes preferred by the subscriber device and/or one or more users with access to the subscriber device, wherein the list includes preferred media attributes in order from the most requested/received attribute to the least requested/received attribute. When the subscriber device receives a request for multimedia content, the subscriber device can identify one or more media attributes preferred by the subscriber, and media renditions of the multimedia content in each of the identified attributes can be downloaded to the subscriber device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a mark-up language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and till achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. An advertisement preparation system (APS) operatively connected to a transcoder, the APS having a processor configured to:
   receive an advertisement and metatdata related to an advertisement;
   compare an actual duration of the advertisement to information in the metadata indicating a presumed duration of the advertisement; and
   based on the comparison, when the actual duration does not match the presumed duration, selectively instruct the transcoder to modify the advertisement in a manner that the actual duration matches the presumed duration.

2. The APS of claim 1, wherein when the comparison shows that the actual duration is longer than the presumed duration, editing the advertisement includes deleting one or more frames such that the actual duration of the edited advertisement matches the presumed duration.

3. The APS of claim 2, wherein deleting one or more frames when the actual duration is longer than the presumed duration includes:
   determining the number of black frames present in the advertisement; and
   deleting one or more of the black frames such that the actual duration of the edited advertisement matches the presumed duration.

4. The APS of claim 3, wherein deleting one or more of the black frames includes deleting the one or more of the black frames such that there is the same number of black frames in the beginning and in the end of the advertisement.

5. The APS of claim 2, wherein deleting one or more frames includes:
   determining the number of repeated frames present in the advertisement; and
   deleting one or more of the repeated frames such that the actual duration of the edited advertisement matches the presumed duration.

6. The APS of claim 1, wherein editing the advertisement includes slowing down or speeding up the frames by interpolating new frames of the advertisement such that the actual duration of the edited advertisement matches the presumed duration.

7. The APS of claim 1, wherein editing the advertisement when the presumed duration does not match the actual duration includes selectively repeating the last frame such that the actual duration of the edited advertisement matches the duration information.

8. The APS of claim 7, wherein repeating the last frame includes fading out to black over duration of the repeated last frame.

9. The APS of claim 1, wherein editing the advertisement includes selectively:
   identifying repeated frames in the advertisement;
   adding one or more frames identical to the repeated frames such that the actual duration of the edited advertisement matches the duration information.

10. The APS of claim 1, wherein editing the advertisement includes selectively adding one or more black frames such that the actual duration of the edited advertisement matches the duration information.

11. The APS of claim 10, wherein adding one or more of the black frames includes adding the one or more of the black frames such that the same number of black frames are in the beginning and in the end of the advertisement.

12. The APS of claim 1, further comprising reprocessing audio associated with the advertisement such that the audio remains synchronized with the edited advertisement.

13. An advertisement preparation system including at least one processor and at least one memory having a tangible, non-transitory computer-readable medium, the advertisement preparation system performing the steps comprising:
   comparing an actual duration of an advertisement to a presumed duration of the advertisement specified in metadata associated with the advertisement; and
   based on the comparison, selectively editing the advertisement to ensure that that the actual duration of the edited advertisement matches the presumed duration.

14. The system of claim 13, wherein the advertisement preparation system additionally performs the step of deleting one or more frames such that the actual duration of the edited advertisement matches the presumed duration.

15. The system of claim 14, wherein the advertisement preparation system additionally performs the steps of:
   determining the number of black frames present in the advertisement; and
   deleting one or more of the black frames such that the actual duration of the edited advertisement matches the presumed duration.

16. The system of claim 13, wherein the advertisement preparation system additionally performs the step of repeating the last frame such that the actual duration of the edited advertisement matches the presumed duration.

17. The system of claim 16, wherein the advertisement preparation system additionally performs the step of fading out to black over the duration of the one or more repeated last frames.

18. The system of claim 13, wherein the advertisement preparation system additionally performs the step of adding one or more black frames such that the actual duration of the edited advertisement matches the presumed duration.

19. The system of claim 13, wherein the advertisement preparation system additionally performs the step of slowing down or speeding up the frames by interpolating new frames of the advertisement such that the actual duration of the edited advertisement matches the presumed duration.

20. The system of claim 13, wherein the advertisement preparation system additionally performs the step of reprocessing audio associated with the advertisement such that the audio remains synchronized with the edited advertisement.

* * * * *